US011255802B2

(12) United States Patent
Tsubota

(10) Patent No.: US 11,255,802 B2
(45) Date of Patent: Feb. 22, 2022

(54) BEST SOLUTION CALCULATION METHOD AND DOMINANT SOLUTION CALCULATION METHOD FOR CALCULATION PARAMETER IN POWDER DIFFRACTION PATTERN, AND PROGRAM THEREOF

(71) Applicant: PHYSONIT INC., Kaita-cho (JP)

(72) Inventor: Masami Tsubota, Kaita-cho (JP)

(73) Assignee: PHYSONIT INC., Hiroshima (JP)

( * ) Notice: Subject to any disclaimer, the term of this patent is extended or adjusted under 35 U.S.C. 154(b) by 136 days.

(21) Appl. No.: 16/618,784

(22) PCT Filed: Jun. 1, 2018

(86) PCT No.: PCT/JP2018/021153
§ 371 (c)(1),
(2) Date: Dec. 2, 2019

(87) PCT Pub. No.: WO2018/221718
PCT Pub. Date: Dec. 6, 2018

(65) Prior Publication Data

US 2021/0080407 A1 Mar. 18, 2021

(30) Foreign Application Priority Data

Jun. 2, 2017 (JP) ............................ JP2017-110500

(51) Int. Cl.
*G01N 23/2005* (2018.01)
*G01N 23/207* (2018.01)

(52) U.S. Cl.
CPC ....... *G01N 23/2005* (2013.01); *G01N 23/207* (2013.01)

(58) Field of Classification Search
CPC ............ G01N 23/2005; G01N 23/207; G01N 2223/62; G01N 23/2055
See application file for complete search history.

(56) References Cited

U.S. PATENT DOCUMENTS

2012/0186449 A1* 7/2012 Yaghi ..................... C07F 3/003 95/90

OTHER PUBLICATIONS

Cullity, "Shinban Cullity X-sen kaisetsu gairon," Agune-shoufuusya, Jun. 20, 1980, Tokyo, Japan.

R.J. Hill, "Rietveld refinment round robin, I. Analysis of standard X-ray and neutron data for PbSO4," Journal of Applied Crystallography, 1992, vol. 25, pp. 589-610.

(Continued)

*Primary Examiner* — David P Porta
*Assistant Examiner* — Mamadou Faye

(57) ABSTRACT

The present invention provides a method to calculate refinement parameters from an observed diffraction pattern for powder samples accurately. A method to calculate a best solution of the crystal structural parameters from a diffraction pattern, comprising: a third calculating step of the converged values 600 to calculate at least three converged values; a third judging step of the best converged values 700 to calculate at least three criteria from the peak-shift parameters in the converged values and to judge whether the converged values are a true solution of not by using the criteria; and a first calculating step of a global solution 800 to calculate a global solution of which is the true value by using the criteria.

8 Claims, 10 Drawing Sheets

(56) References Cited

OTHER PUBLICATIONS

Search Report dated Aug. 21, 2018 for PCT Application No. PCT/JP2018/021153.
"Determination of asbestos in building material products," JIS A 1481, 2016.
Nakai, et al. "Funmatsu X-sen kaisetsu no jissai," Asakura shoten, 2009, 2nd edition, Tokyo, Japan.
Rietveld, "A Profile Refinement Method for Nuclear and Magnetic Structures," Journal of Applied Crystallography, 1969, vol. 2, pp. 65-71.
"Rika nenpyo Heisei 21," Ed. National Astronomical Observatory of Japan, Maruzen, Nov. 30, 2008, pp. 401-402, Tokyo, Japan.
B.H. Toby, "R factors in Rietveld analysis: How good is good enough?", Powder Diffraction, 2006, vol. 21, pp. 67-70.
Tsubota, et al., "RIETAN-FP de manabu Rietveld kaiseki," Johokiko, 2012, Tokyo, Japan.
Young, "Rietveld method," Oxford Univ Press, 1993, Oxford, United Kingdom, 1993.

* cited by examiner

BEST SOLUTION CALCULATION METHOD AND DOMINANT SOLUTION CALCULATION METHOD FOR CALCULATION PARAMETER IN POWDER DIFFRACTION PATTERN, AND PROGRAM THEREOF

CROSS-REFERENCE TO RELATED APPLICATION PARAGRAPH

The present application is a National Stage of International Application No. PCT/JP2018/021153, filed on Jun. 1, 2018 which claims priority to and the benefit of Japanese Patent Application No. 2017-110500, filed on Jun. 2, 2017, the disclosure of which is incorporated herein by reference in its entirety.

BACKGROUND OF THE INVENTION

Field of the Invention

The present invention is related to the field of crystallography. To be more precise, the invention is related to a method and a program that are capable of determining the best or better parameters for the powder diffraction pattern.

Description of the Related Art

To determine the crystal structure for powders, several pattern-fitting methods by using the X-ray and/or neutron diffraction pattern have been developed. Among them, the Rietveld method is widely used. By applying the method, the crystal and the magnetic structures are obtained. In addition, crystalline size, strain, mosaicity, charge/nuclear densities, and quantitative analysis, i.e., a ratio between crystalline and amorphous phases, etc. can be calculated from the crystal structural parameters.

This technique can be applied for diffraction pattern which is collected by using a familiar and conventional diffractometer in short time; therefore, it is widely used to research, develop, and mass-produce in numerous fields of the functional materials such as electronic, magnetic, metal, superconductivity, battery, ceramics, pharmaceuticals and food additives, etc. For instance, as shown in Ref 2, it is defined by law of Japanese Industrial Standards to apply a powder X-ray diffraction method to analyze samples with high concentration of asbestos. For this, the Rietveld method is used. Another example in industry is the quantitative analysis for cement clinker.

The principle of the Rietveld method is written in Refs. 3 to 5 in detail. In the following, the principle of the Rietveld method is briefly introduced. The square sum of the weighted residual, $S_R$, is minimized to refine the parameters in the formula during refinements. The weighted-pattern reliability factor, $R_{wp}$, which is defined by the observed intensity ($y_{oi}$), the calculated intensity ($y_{ci}$) and the weight $w_i$, at the point i, is used as an indicator of the best fit of the data. Here, $w_i \equiv 1/y_{oi}$ is generally adopted. $R_{wp}$ is used to judge the goodness-of-fit. $R_{wp}$ is proportional to the square of $S_R$. The other reliability factors used for this purpose are also suggested to judge the goodness-of-fit. Among them, $S \equiv R_{wp}/R_e$ is a candidate, where $R_e$ is the expected R-factor. It is empirically proposed that: (1) an enough good fitting for $S<1.3$, (2) possibly good fitting (but might be a better fitting) to confirm the structural model and/or result for $1.3<S<1.7$ and (3) no-convergence for $S>1.7$ (Refs. 3 and 4). Note that it is a critical feature that the conventional indicators are calculated by all the calculated and observed parameters to convert into a figure related to the longitudinal axis of the data.

REFERENCES

1. H. M. Rietveld, Journal of Applied Crystallography, 2, (1969) 65-71. (Received: 1968 Nov. 28)
2. "Determination of asbestos in building material products", JIS A 1481 (2016).
3. "Rietveld method", ed. R. A. Young, Oxford Univ Press, Oxford, United Kingdom, 1993. (Published: 1995 Jan. 19)
4. "Funmatsu X-sen kaisetsu no jissai $2^{nd}$ edition", eds. I. Nakai and F. Izumi, Asakura shoten, Tokyo, Japan, 2009 (Published: 2009 Jul. 10)
5. "RIETAN-FP de manabu Rietveld kaiseki", M. Tsubota and T. Itoh, Johokiko, Tokyo, Japan, 2012. (Published: 2012 Jul. 2)
6. "Shinban Cullity X-sen kaisetsu gairon", Agune-shoufuusya, Tokyo, Japan, 1980. (Published: 1980 Jun. 20)
7. R. J. Hill, Journal of Applied Crystallography 25, (1992) 589-610. (Received: 1991 Sep. 27)
8. "Rika nenpyo Heisei 21", pp. 401-402, Ed. National Astronomical Observatory of Japan, Maruzen, Tokyo, Japan. (Published: 2008 Nov. 30)
9. B. H. Toby, *Powder Diffraction* 21, (2006) 67-70. (Received: 2005 Dec. 19)

SUMMARY OF INVENTION

Technical Problem

However, it is impossible to obtain the refinement parameters with high accuracy in the Rietveld method. The results depend not only on the quality of the powdered sample and the effect of measurement errors of the observed diffraction pattern but also who and when analyzes. Thus, it is difficult to obtain parameters within 1% of accuracy. In Ref 4, there are the following two descriptions: 1) the absolute value of the refinement parameters cannot be obtained, 2) the internal material such as a standard reference material (SRM) of certificated quality supplied by the National Institute of Standards of Technology (NIST) should be mixed, then a diffraction pattern is collected and used it for refinement. The internal standard method is recognized as a very fundamental method not only for the Rietveld analysis but also for analyzing the powder diffraction pattern; therefore, it is also described in ref 6. Some researchers/technicians analyze the data without the above knowledges.

For instance, Reference 7 describes the specific cases related to the above-mentioned issue. Hill summarized the results of Rietveld refinements on the project undertaken by the Commission on Powder Diffraction of the International Union of Crystallography. Several specialists analyzed the powder diffraction pattern of standard $PbSO_4$ (generally used as a battery), measured by a conventional Bragg-Brentano diffractometer using Cu Kα radiation. Because several experts analyzed the same data, the quality of a sample and a measurement error principally never make a difference in analyzing the results. This fact indicates that if the results differ, it should be caused by the refinement processes.

The results showed clear deviation. The lattice parameters a, b and c are in the range of 0.84764-0.84859 nm, 0.53962-0.54024 nm and 0.69568-0.69650 nm, respectively. The accuracy of the lattice parameters is of an order of 0.001 nm or 0.1%. Furthermore, the weighted mean parameters for a-, b- and c-axes are 0.84804(4) nm, 0.53989(3) nm and 0.69605(2) nm, respectively. They are in good agreement with those determined from single-crystal X-ray diffraction data which is generally accepted to be highly accurate. These facts mean that 1) both the results from powder and single-crystal are same in principle and 2) either smaller or larger lattice parameters compared to the true one is possibly obtained depending on a researcher by the Rietveld method. Thus, it is obvious that a unique result with high accuracy cannot be obtained even for the specialists and the difference between the results comes from the analyzing process.

Note that, as shown above, the accuracy of the lattice parameters is of an order of 0.001 nm, which is incomparably large considering that the linear thermal expansion coefficient, generally, is of an order of $10^{-5}$ $K^{-1}$ to $10^{-6}$ $K^{-1}$ for solid materials (Ref 8). This issue should be addressed with priority.

Considering these situations, Prince has stated, "stopping and finishing are different," in Ref 3. Also, in Ref 9, Toby mentioned, "These factors are only one criterion for judging the quality of Rietveld fits and the most important way to determine the quality of a Rietveld fit is by viewing the observed and calculated patterns graphically." Hill also stated that "A difference profile plot is probably the best way of following and guiding a Rietveld refinement."

Thus, there is a numerical criterion to evaluate the best fit of the data but it is insufficient to obtain the refinement parameters accurately. As mentioned above, suggesting several criteria, apart from $R_{wp}$, implies that we cannot obtain the refinement parameters accurately by using $R_{wp}$.

The present invention has been made by consideration of the above situation which sets the objective of the invention to provide a method/program for judging a true solution. The method/program comprises the steps of calculating a criterion that corresponds to the peak-shift and then judging the true solution by the criterion.

Means to Solve Problem

To solve the above shown problems, the present invention includes eight claims shown below.

1. A calculation method to judge a best solution of refinement parameters for a powder diffraction pattern, comprising:
   - a first calculating step of converged values for the refinement parameters; and
   - a first judging step of the best converged values to calculate a criterion from peak-shift parameters in the converged values and to judge whether the above converged values are the true values or not.
2. A calculation method to judge a better solution of refinement parameters for a powder diffraction pattern, comprising:
   - a second calculating step of converged values to calculate at least two sets of converged values of the refinement parameters for the powder diffraction pattern;
   - a second judging step of best converged values to calculate at least two criteria from peak-shift parameters in the converged values and to judge whether the above sets of the converged values are the true values or not; and
   - a first selecting step of a better solution to select the converged values which are closer to the true solution among several sets of the by using at least two criteria.
3. A calculation method to judge a best solution of refinement parameters for a powder diffraction pattern, comprising:
   - a third calculating step of converged values to calculate at least three sets of converged values of the refinement parameters for the powder diffraction pattern;
   - a third judging step of the best converged values to calculate at least three criteria from peak-shift parameters in the converged values and to judge whether the above sets of the converged values are the true values or not; and
   - a first calculating step of a global solution to judge which converged values is the true global solution among several sets of the converged values by using at least three criteria.
4. A calculation program to judge a best solution of refinement parameters for a powder diffraction pattern, comprising:
   - a first calculating step of converged values for the refinement parameters; and
   - a first judging step of the best converged values to calculate a criterion from peak-shift parameters in the converged values and to judge whether the above converged values are the true values or not.
5. A calculation program to judge a better solution of refinement parameters for a powder diffraction pattern, comprising:
   - a second calculating step of converged values to calculate at least two sets of the converged values of the refinement parameters for the powder diffraction pattern;
   - a second judging step of the best converged values to calculate at least two criteria from the peak-shift parameters in the converged values and to judge whether the above sets of the converged values are the true values or not; and
   - a first selecting step of a better solution to select the converged values which are closer to the true solution among several sets of the by using at least two criteria.
6. A calculation program to judge a best solution of refinement parameters for a powder diffraction pattern, comprising:
   - a third calculating step of converged values to calculate at least three sets of converged values of the refinement parameters for the powder diffraction pattern;
   - a third judging step of the best converged values to calculate at least three criteria from peak-shift parameters in the converged values and to judge whether the above sets of the converged values are the true values or not; and
   - a first calculating step of a global solution to judge which converged values is the true global solution among several sets of the converged values by using at least three criteria.
7. A calculation method to judge the best solution of refinement parameters for a powder diffraction pattern, comprising a criterion relating to information along the x-axis of the data, which is calculated directly from the peak-shift parameters and the lattice parameters, wherein "the x-axis of the data" indicates a physical quantity which corresponds to the space lattice of the unit cell such as a diffraction angle or time-of-flight.
8. A calculation program to judge the best solution of refinement parameters for a powder diffraction pattern, comprising a criterion relating to information along the x-axis of the data, which is calculated directly from the peak-shift parameters and the lattice parameters.

Effects of the Invention

The present invention has the following effects.

According to the present invention, the refinement parameters can be obtained with high accuracy. The true value of the lattice parameter within an accuracy of 0.000006 nm is obtained. The accuracy is improved further by two orders of magnitude (i.e., two more digits lower) compared to that obtained by the conventional Rietveld method. For the present invention, one does not require to mix the standard reference material with a sample. The invention also overcomes the comparison among several diffraction data because the result is independent of the range of the observed diffraction angle or the apparatus. Therefore, it is effectively adoptable for fundamental research, technical application as well as quality control of the mass-products.

Note that using information along the x-axis of the data such as the peak-shift parameters and the lattice parameters directly to an indicator of fits. It also means that no information along the y-axis is used or no translation of the indicator to information along the y-axis. Furthermore, several analyses are performed for the identical data in the present invention. Thus, the results depend on the 2θ-range used in the analysis. These are not mentioned in Refs. 1-9 at all.

BRIEF DESCRIPTION OF THE DRAWINGS

These and other features as well as the advantages of the present invention will be more readily appreciated when considered in connection with the following detailed description and appended drawings, wherein.

DETAILED DESCRIPTION OF THE INVENTION

The present invention will now be described by referring to the appended figures representing preferred embodiments. The major feature of the method/program of the invention is to introduce a criterion of the peak-shift, which is a physical quantity along the x-axis of the data. In the present disclosure, the X-ray diffraction data of standard reference material (SRM) 660a (lanthanum hexaboride, $LaB_6$) from the National Institute of Standards and Technology (NIST) collected with Cu $K\alpha_1$ radiation was used, where the lattice parameter $a_{NIST}$=0.41569162(97) nm≃0.415692(1) nm at 22.5° C. The profile function of a Thompson-Cox-Hastings pseudo-Voigt function was used. Howard's method, which is based on the multi-term Simpson's rule integration, was employed for the profile asymmetry. The background function was the sixth order of Legendre polynomials.

Figure 1A:
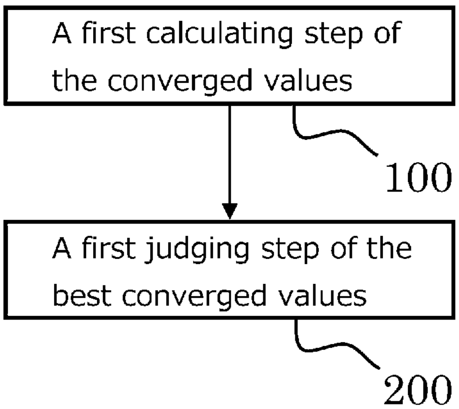
FIGS. 1(*a*)-1(*c*) depict elaborated perspective views of analyzing methods for powder diffraction pattern.
Figure 1B:
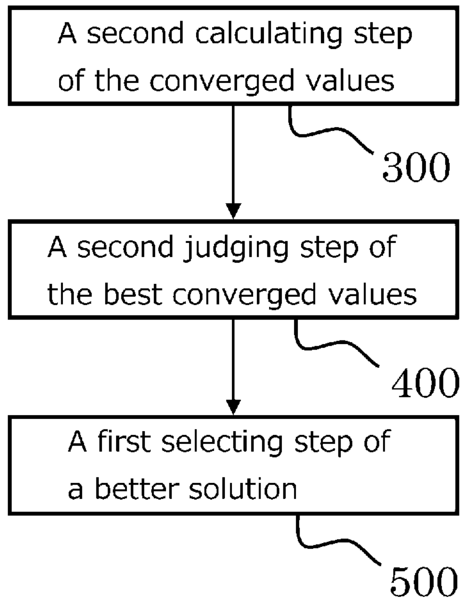
Figure 1C:
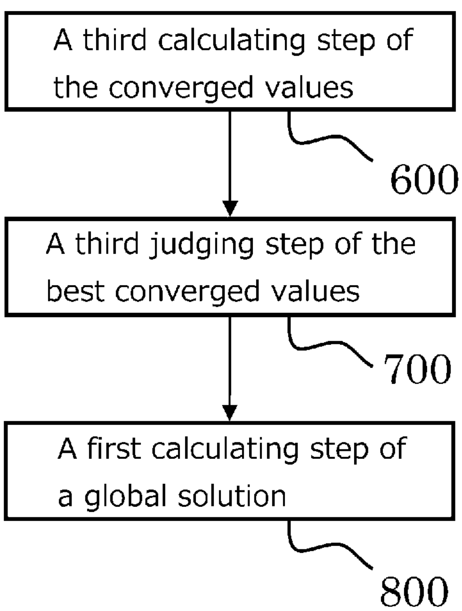

The method for obtaining best solution in the diffraction pattern is a method by performing several Rietveld analyses; and comprising the steps of calculations; a first calculating step of the converged values 100 and a first judging step of the best converged values 200, or a second calculating step of the converged values 300, a second judging step of the best converged values 400 and a first selecting step of the better solution 500 or a third calculating step of the converged values 600, a third judging step of the best converged values 700 and a first calculating step of the global solution 800 as shown in FIG. 1(*a*)-FIG. 1(*c*).

The feature especially comprises the second calculating step of the converged values 300 or the first calculating step of the global solution 800.

First Embodiment

The schematic view for calculating the best solution of the embodiment is shown in FIG. 1(*a*).

At the first calculating step of the converged values 100, the conventional Rietveld analysis is conducted to obtain the convergence value of the refinement parameters. Next, the peak-shift at each Bragg reflection hkl is calculated by using the peak-shift parameters among the above-obtained refinement parameters, and then obtains the sum. If the sum is finite, the solution is not the best one. If the sum is zero, the solution is the best one.

Figure 2:
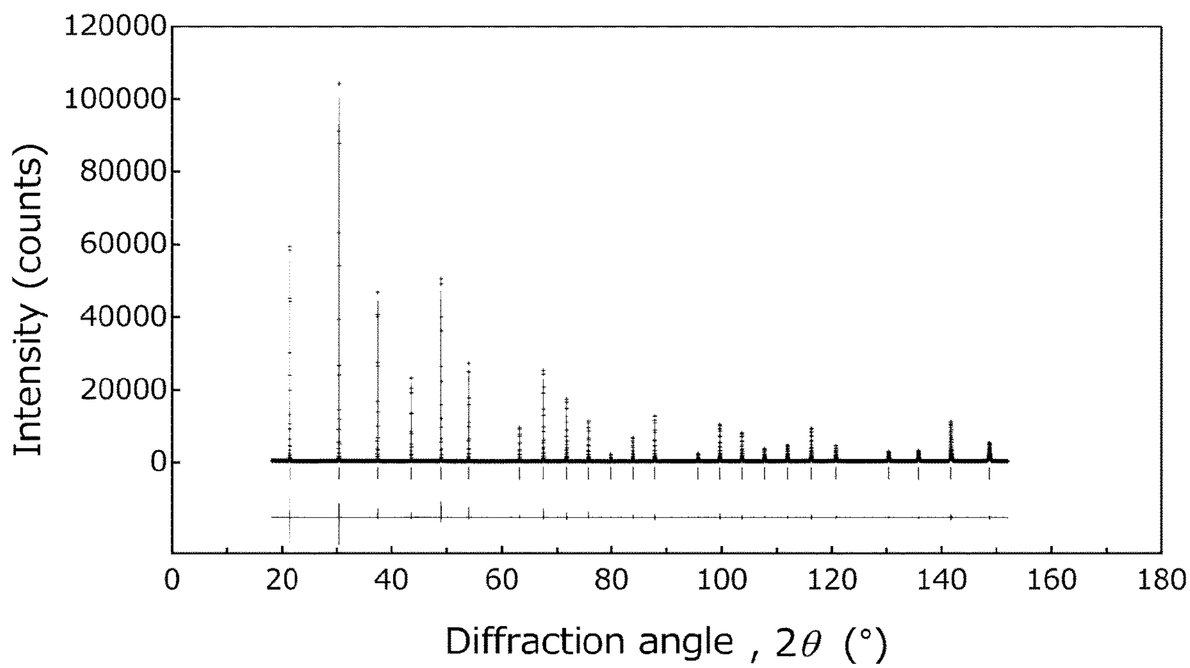
FIG. 2 is an example scheme showing the first calculating step of the converged values for the powder diffraction pattern.

FIG. 2 demonstrates an example of the embodiment of the first calculating step of the converged values 100. The reliability factor $R_{wp}$ is 8.203%. The lattice parameter α is 0.415655(1) nm. The peak-shift parameters are Z=0.0473 (17)°, $D_s$=−0.0786(15)° and $T_s$=0.00106(22)°.

The sum of the peak-shift obtained by using the above peak-shift parameters is 0.3816. Because the sum is finite, it can be judged that the solution may have possibility not be the best one (the first judging step of the best converged values 200). This is consistent with the result of $a \neq a_{NIST}$. Here, the most important feature of the present invention is to judge a solution by using information along x-axis such as the peak-shift parameters and the lattice parameters.

Second Embodiment

Next, referring to FIG. 1(*b*), the second embodiment for calculating the better solution is described.

At the second calculating step of the converged values 300, at first, a parameter is selected among the peak-shift parameters, structural parameters, surface-roughness parameters and profile parameters.

At least two Rietveld analyses with the different initial values for the above-selected parameter are performed, and then obtain the solutions which correspond to each initial parameter. Here, by performing with fixing the value for the above-selected parameters, the solutions, which correspond to each initial parameter can certainly be obtained.

Nest, for the second judging step of the best converged values 400, same as the first judging of the best converged values 200, the peak-shift at each Bragg reflection hkl is calculated by using the peak-shift parameters among the above-obtained refinement parameters, and then obtain the sum.

At the first selecting step of a better solution 500, compare the above-obtained sums; the smaller one is closer to the true solution than the others.

Figure 3A:
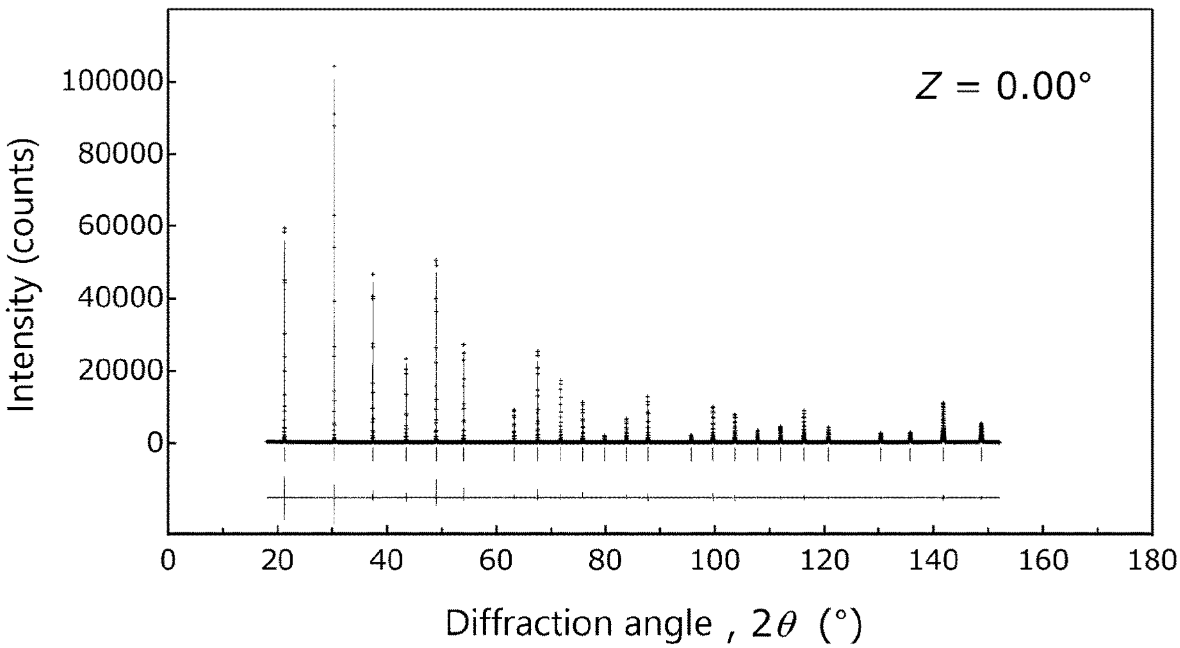
FIGS. 3(*a*)-3(*b*) are example schemes showing the second calculating step of the converged values for the powder diffraction pattern.
Figure 3B:
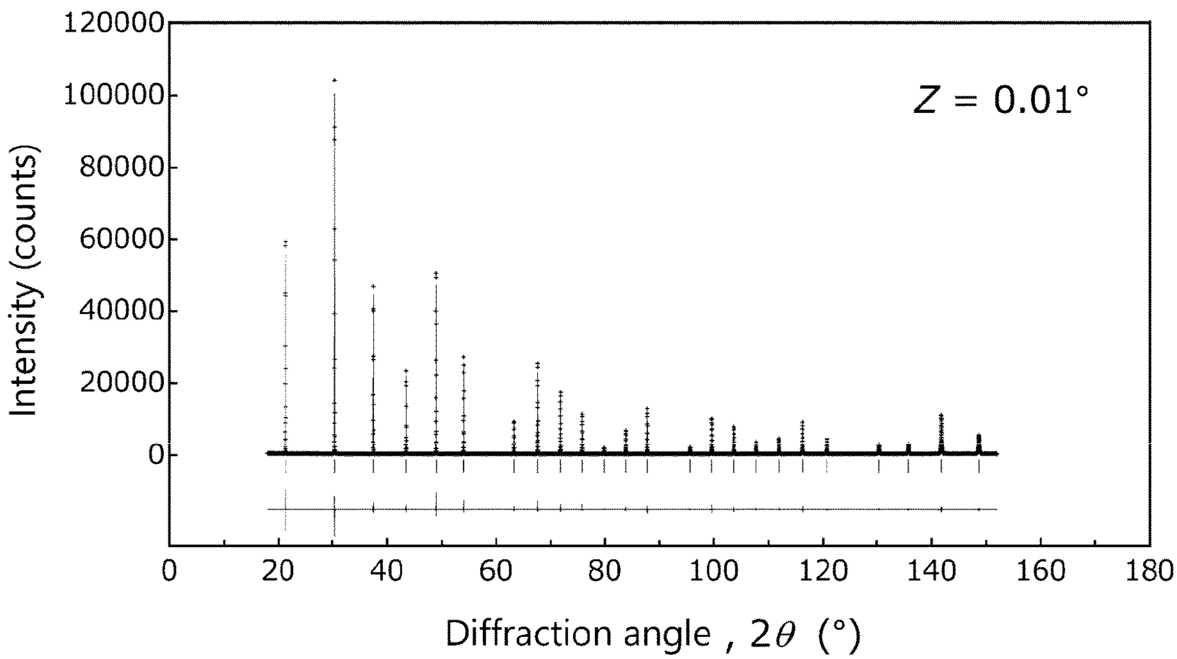

For an example of the second calculating step of the converged values 300, the first term Z in the peak-shift parameters is selected and given the values of Z=0.00 and 0.01 for the initial values. FIGS. 3(*a*) and 3(*b*) shows the example results for Z=0.00 and 0.01. The reliability factor $R_{wp}$, for Z=0.00 is 8.405%. The obtained lattice parameter α is 0.415697(1) nm. Further, the peak-shift parameters are Z=0.00°, $D_s$=−0.0348(13)° and $T_s$=0.00143(17)°. $R_{wp}$ for Z=0.01 is 8.329%. The lattice parameter α is 0.415688(1) nm. The peak-shift parameters are Z=0.01°, $D_s$=−0.0441 (13)° and $T_s$=0.00135(17)°.

For the embodiment in the second judging step of the best converged valued 400, the sum is computed by using the above-obtained peak-shift parameters. The sums are 0.2987 for Z=0.00 and 0.2640 for Z=0.01. Both of them are finite values, therefore, it can be judged that the solution may have possibility not be the best one. This is consistent with the above-obtained results of a $a \neq a_{NIST}$.

For the embodiment of the first selecting step of a better solution 500, the above sums are compared. By comparing 0.2987 and 0.2640, the solution for Z=0.01 is closer than that for Z=0.01 to the true solution. Actually, the true lattice parameter is 0.415692(1) nm, and the difference between the obtained lattice parameters and the true one are 0.000005 nm for Z=0.00 and 0.000004 nm; therefore, it is confirmed that the lattice parameter for Z=0.01 is closer to the true one than that for Z=0.00.

Third Embodiment

Next, referring to FIG. 1(*c*), the third embodiment for calculating the better solution is shown below.

At the third calculating step of the converged values 600, at first, a parameter is selected among the peak-shift parameters, structural parameters, surface-roughness parameters and profile parameters.

At least three Rietveld analyses with the different initial values for the above-selected parameter are performed, and then obtain the solutions which correspond to each initial parameter. Here, by performing with fixing the value for the above-selected parameters, the solutions, which correspond to each initial parameter, can certainly be obtained.

Nest, for the third judging step of the best converged values 700, same as the second judging of the best converged values 400, the peak-shift at each Bragg reflection hkl is calculated by using the peak-shift parameters among the above-obtained refinement parameters, and then obtain the sum.

At the first calculating step of the global solution 800, the above-obtained sums are used. By comparing the sums or curve-fitting by such as a quadratic function; the smallest solution, which is the global solution, is obtained.

Figure 4:
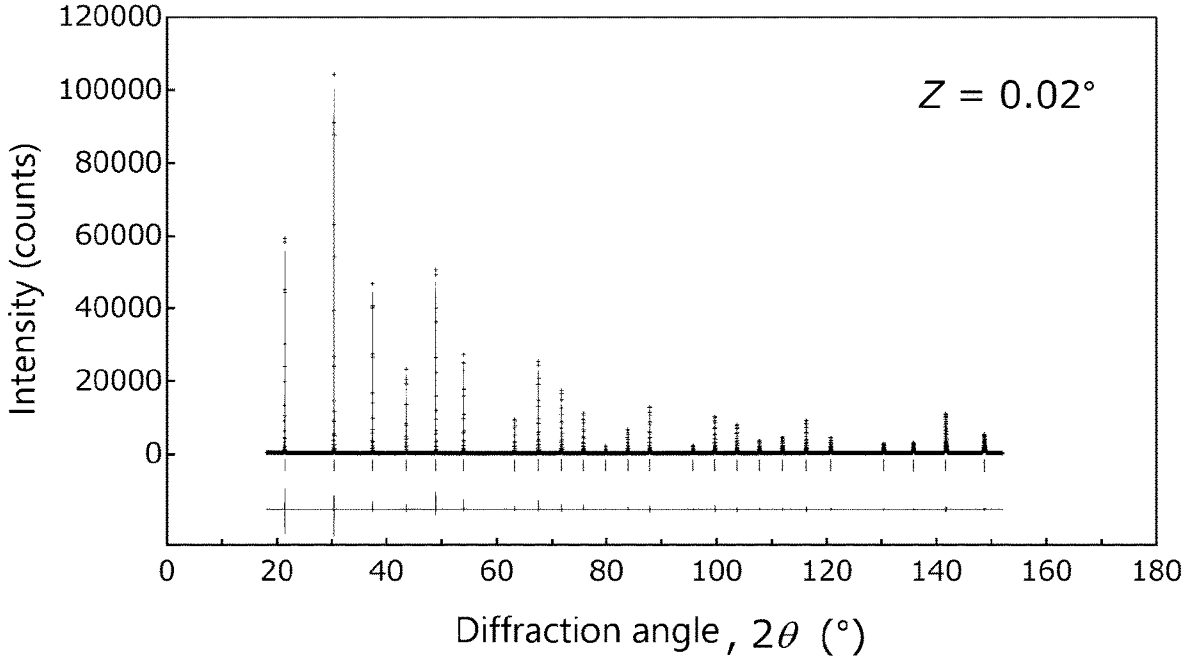
FIG. 4 is an example scheme showing the third calculating step of the converged values for the powder diffraction pattern.

For an example of the third calculating step of the converged values 600, the first constant term Z in the peak-shift parameters is selected and given the values with a step of 0.001 or 0.01 in the range of $-0.2 \le Z \le 0.2$ for the initial values. The example results for Z=0.00 and 0.01 in FIG. 3(*a*)-FIG. 3(*b*) as well as that for Z=0.02 in FIG. 4 are shown. The reliability factor $R_{wp}$ for Z=0.02 is 8.272%. The obtained lattice parameter α is 0.415679(0) nm. Further, the peak-shift parameters are Z=0.02°, $D_s$=−0.0533(13)° and $T_s$=0.00127(17)°.

For the embodiment of the third judging step of the best converged values 700, the sums, which are computed by using the above-obtained peak-shift parameters, are 0.2987 for Z=0.00, 0.2640 for Z=0.01 and 0.2740 for Z=0.02. All of them are finite values; therefore, it can be judged that the solution may have the possibility not be the best one. This is consistent with the above-obtained results of $a \neq a_{NIST}$.

For the embodiment of the first calculating step of the global solution 800, the above-obtained sums are compared. By comparing 0.2987, 0.2640 and 0.2740, it is found that the solution for Z=0.01 is closer than those for Z=0.00 and 0.02 to the true solution. Actually, the true lattice parameter is 0.415692(1) nm, and the difference between the obtained lattice parameters and the true one are, respectively, 0.000005 nm for Z=0.00, 0.000004 nm for Z=0.01 and 0.000013 nm for Z=0.02; therefore, it is confirmed that the lattice parameter for Z=0.01 is the closest to the true one. Moreover, the conventional criterion of fit for $R_{wp}$'s are 8.405% for Z=0.00, 8.329% for Z=0.01 and 8.272% for Z=0.02. In the case of judging by $R_{wp}$, the solution for Z=0.02 could be the closest to the true one. However, it is obvious that the deviation of the lattice parameter for Z=0.02 from the true one is the largest among them. Thus, the true solution cannot be obtained by the conventional criterion on $R_{wp}$.

Figure 5:
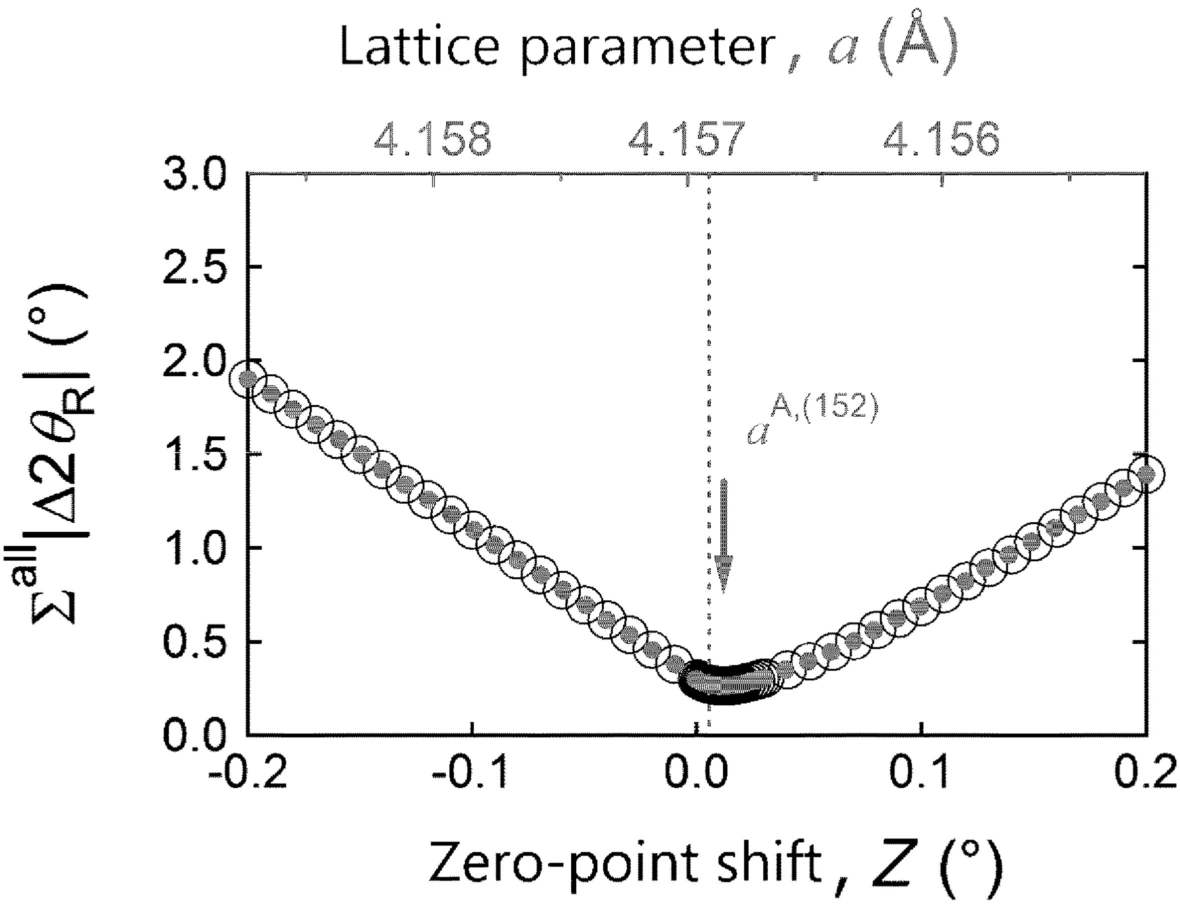
FIG. 5 is an example scheme showing the first calculating step of the global solution for the powder diffraction pattern.

In the above description, the results for three Z-values are shown. All the results for the steps 600 to 800 in the range of $-0.2 \le Z \le 0.2$ are shown in FIG. 5. The vertical axis is the sum, the lower horizontal axis is Z and the upper horizontal axis is a in FIG. 5. The Z- and a-dependences of the sum show a V-shaped curve. The minimum value of the sum is 0.2628 at Z=0.012 with the lattice parameter of 0.145686(0) nm. It is thus found that the lattice parameter is determined within a high-accuracy of 0.000006 nm compared to the certificated value of $a_{NIST}$=0.415692 nm.

Note that it has been suggested that viewing a difference in the profile-plots between the observed and the calculated intensities is effective to judge a goodness-of-fit according to Refs. 7 and 9. However, the difference is too small to visually discriminate as shown in FIGS. 2-4.

Figure 6:
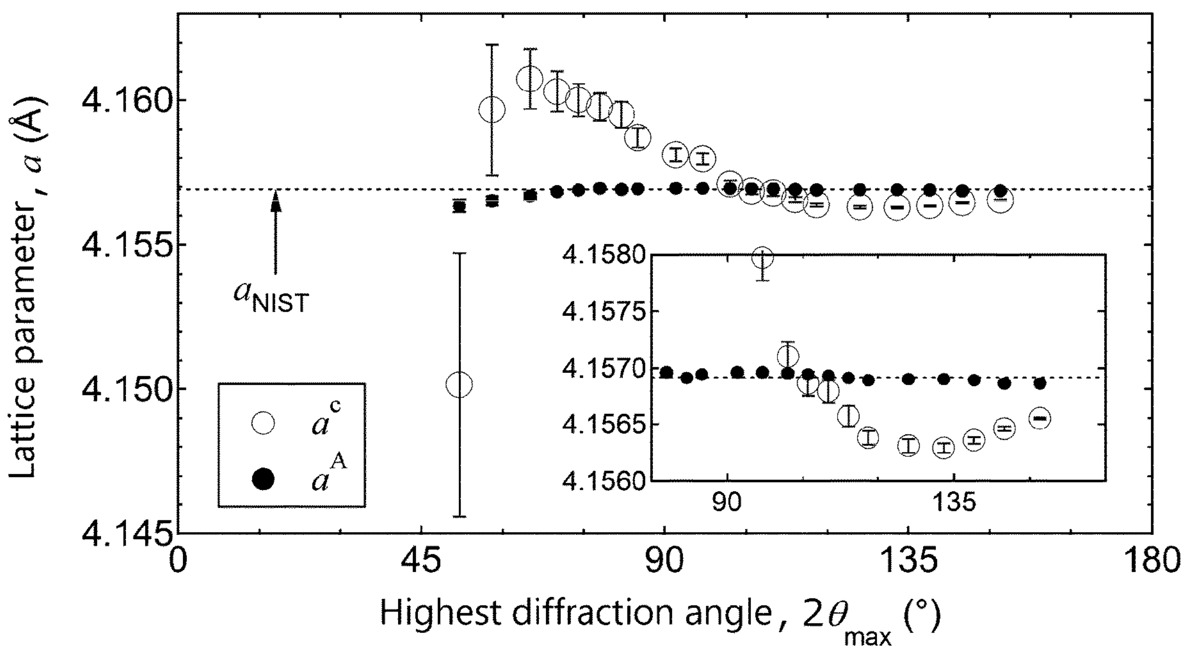
FIG. 6(*a*) is the example results of the lattice parameter obtained by the conventional criterion and a new criterion of the present invention.
Figure 7A:
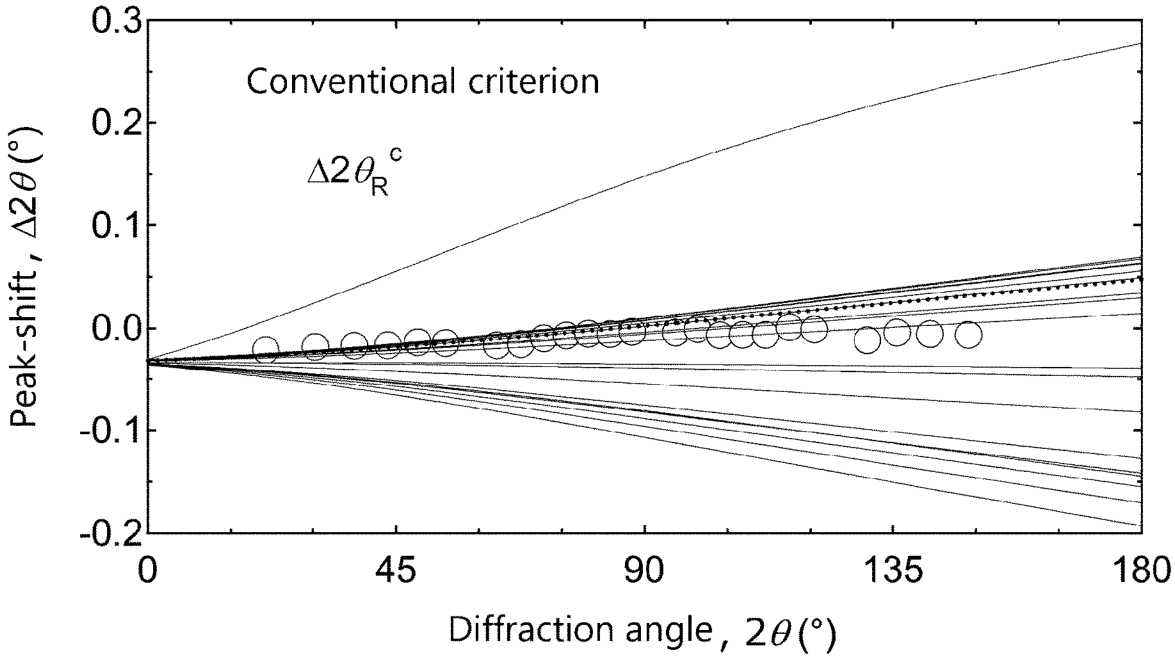
FIGS. 7(*a*)-7(*b*) are the example results comparing of the peak-shift parameter obtained by the conventional criterion and a new criterion of the present invention.
Figure 7B:
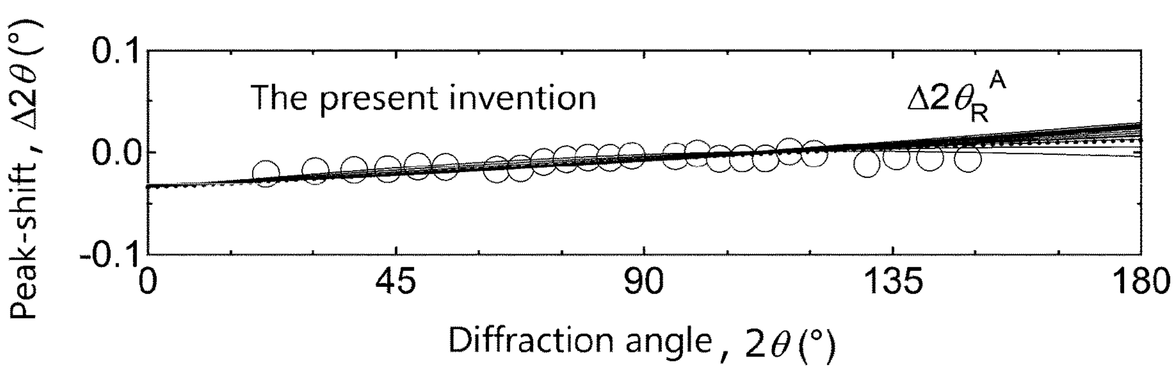

Next, referring FIGS. 6 and 7, the effects of the embodiment in the present invention are described in detail.

It is natural that the range of the diffraction angles in the powder diffraction pattern depends on the apparatus, the sample, or the person executing the experiment. For example, although the diffraction data used in this embodiment includes very high diffraction angle up to 2θ=152°, the highest diffraction angle observed in the experiment is usually 120°, 90°, 70°, etc. in most of the case. It is expected that the observed 2θ-range, i.e. the analysis 2θ-range could affect the result. Therefore, we investigated the effect of the highest angle $2\theta_{max}$ used in the analysis on the results.

The lattice parameter obtained by the conventional Rietveld analysis in the range of $52° \le 2\theta_{max} \le 152°$ strongly depends on $2\theta_{max}$ as shown with open circles in FIG. 6. The fact would be expected as shown above; however, has not been reported in any articles leaving the present invention as the first report about it. Moreover, the obtained lattice parameter is larger or smaller than $a_{NIST}$, indicating the accuracy of the parameter is poor. The deviation from $a_{NIST}$ is 0.001 nm at the most and it is the same as the results in Ref 7.

The result obtained by the proposed criterion in the present invention is shown in FIG. 6 with closed circles. The deviation from $a_{NIST}$ is 0.00006 nm at most for $2\theta_{max}$=52° and within 0.000006 nm above $2\theta_{max}$≥74° (See the inset of FIG. 6). Thus, it is found that the lattice parameter can be determined with high accuracy independent on the observed and the analyzing 2θ region by using the criterion proposed in the present invention.

Next, the result of the peak-shift, which has strong correlation with the lattice parameter, is described.

For the powder diffraction pattern, the geometric difference of the peak-shift $\Delta 2\theta \equiv 2\theta_{ideal} - 2\theta_{obs}$ between the ideal diffraction angle $2\theta_{ideal}$ and the experimentally observed $2\theta_{obs}$ may be caused by absorption of X-ray by the sample, the systematic error of the instrument, a misalignment of the apparatus and a sample, etc. The peak-shift function is used to represent and correct the above difference; therefore, it is taken into account in the calculation for the conventional Rietveld analysis as well as in the present invention.

The SRM sample from NIST is provided with a certification, on which various certified values/properties are described, and the list of $2\theta_{ideal}$ is shown for SRM **660*a*** ($LaB_6$).

Here, for a material such as $LaB_6$ with high crystal symmetry, it is possible to evaluate the values of $2\theta_{obs}$ by viewing the raw data. It is because that Bragg peeks independently appear at each different diffraction angle. In the following results, the values of 2θ at the highest diffraction intensity, for each Bragg peak, are defined as $2\theta_{max}$; not to cause a difference by the respective researcher.

In FIG. 7(*a*) and FIG. 7(*b*), the comparison among Δ2θ, calculated by the above-mentioned process with $2\theta_{idel}$ and $2\theta_{obs}$, $\Delta 2\theta_R^c$, obtained by the conventional Rietveld analysis, and $\Delta 2\theta_R^A$, obtained by the embodiment in the present invention, is shown. Δ2θ shown with open circles agrees well with $\Delta 2\theta_R^A$ shown in solid line as shown in FIG. 7(*b*), indicating that the peak-shift is also very well reproduced by the proposed criterion in the present invention. On the contrary, $\Delta 2\theta_R^c$ strongly varies with Z as shown in FIG. 7(*a*) and it is clear that its accuracy is very low. This fact also supports that the proposed criterion using information along x-axis of the data, i.e. the peak-shift parameters and the lattice parameters, is extremely effective.

The present invention is based on the following facts for the Rietveld analysis; (i) the true solution cannot be obtained only by the conventional criterion $R_{wp}$ which is information along the y-axis of the data and (ii) the proposed criterion (hereafter $A_{PS}$), which is information along the x-axis of the data, such as the peak-shift parameters and the lattice parameters, is additionally needed to obtain the true solution accurately. Here, neither (i) or (ii) have been reported in any reference. In the following, the details of the facts (i) and (ii) are described. The representative results for $2\theta_{max}$=152° and 92° are shown.

First, for the fact (i), the reliability factor and the lattice parameter obtained by the conventional Rietveld analysis are $R_{wp}^{c,(152)}$=8.213% and $a^{c,(152)}$=0.415655(1) nm for $2\theta_{max}$=152° and $R_{wp}^{c,(92)}$=8.610% and $a^{c,(92)}$=0.415811(22) nm for $2\theta_{max}$=92°, where the superscripts 'c', (152) and (92) refer to the "conventional", $2\theta_{max}$=152° and $2\theta_{max}$=92°, respectively. $a^{c,(152)}$ and $a^{c,(92)}$ are 0.0089% or 0.000037 nm smaller and 0.0286% or 0.000119 nm larger compared to the certificated value of $a_{NIST}$. Thus, it is obvious that the correct value is not obtained by the conventional Rietveld analysis.

Furthermore, the peak-shift parameters obtained by the above analyses are $Z^{c,(152)}$=0.0473(17)°, $D_s^{c,(152)}$=−0.0786(15)° and $T_s^{c,(152)}$=0.00106(22)° for $2\theta_{max}$=152° and $Z^{c,(92)}$=−0.0479(146)°, $D_s^{c,(92)}$=0.0145(142)° and $T_s^{c,(92)}$=−0.00148(159)° for $2\theta_{max}$=92°, respectively.

Here, the peak-shift $\Delta 2\theta_R$ can be computed by using the above three peak-shift parameters using Eq. (1) (Refs. 3 and 4). Equation (1) represents the difference between the experimentally obtained diffraction angle and the calculated diffraction angle considering the geometry. The subscript 'R' refers to the "Rietveld". Z is the zero-point shift, $D_s$ the specimen-displacement parameter and $T_s$ the specimen-transparency parameter (Refs. 3 and 4).

$$\Delta 2\theta_R = Z + D_s \cos\theta + T_s \sin 2\theta \quad \text{[Equation 1]}$$

Moreover, the reference material is provided with the certification, in which the true values of the peak-shift $2\theta_{true}$ are described. Therefore, the true peak-shift ($\Delta 2\theta_m \equiv 2\theta_{true} - 2\theta_{obs}$) can be calculated by comparing with $2\theta_{obs}$ which is estimated from the observed diffraction pattern, where the subscript 'm' refers to the "manual".

Thus, two peak-shifts $\Delta 2\theta_R^c$ and $\Delta 2\theta_m$ are evaluated as mentioned above.

Figure 8A:
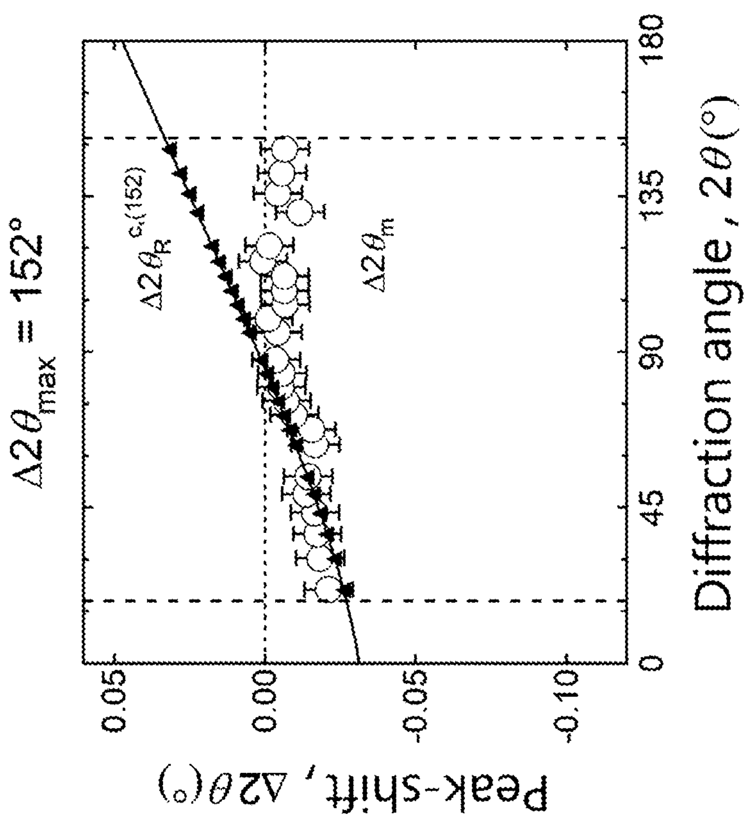
FIGS. 8(*a*)-8(*b*) are the example results of the peak-shift parameter obtained by the conventional criterion (black triangles) and a new criterion of the present invention (open circles).
Figure 8B:
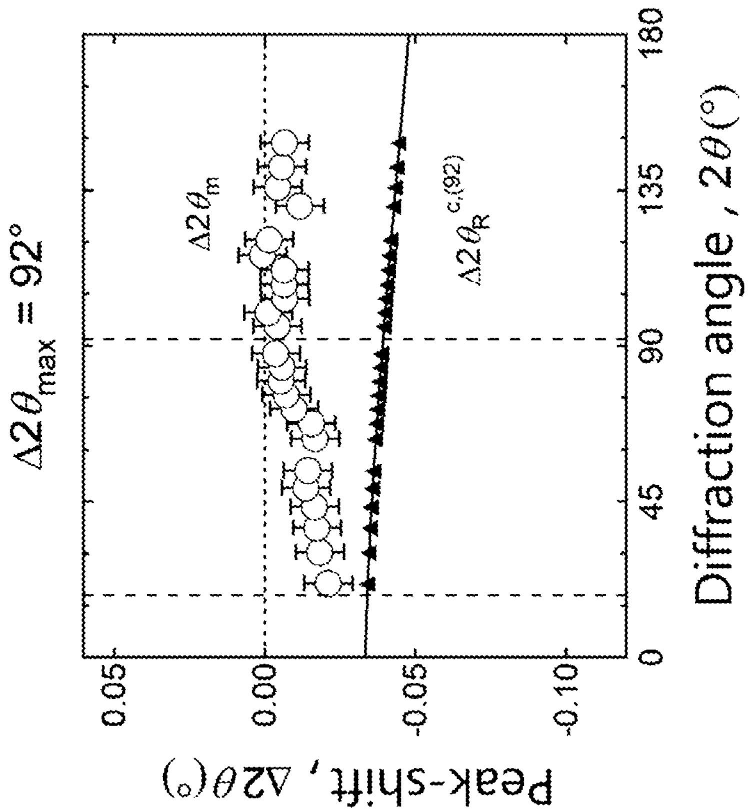

FIGS. 8(*a*) and 8(*b*) show the 2θ dependence of $\Delta 2\theta_R^c$ and $\Delta 2\theta_R^c$ for $2\theta_{max}$=152° and 92°, respectively, 2θ dependence of $\Delta 2\theta_R^c$ is clearly different from that of $\Delta 2\theta_m$. Thus, it is found that the true solution of the peak-shift is not obtained by the conventional Rietveld analysis. Note that the vertical dashed lines in FIGS. 8(*a*) and 8(*b*) represent the smallest and the highest values in the analysis.

So far, it is demonstrated that the true solution is not obtained by the conventional Rietveld analysis, referring the lattice parameter and the peak-shift parameters as a set of examples.

Next, to investigate the reason why the true solution is not obtained by the conventional Rietveld analysis, a modified Rietveld analysis with a fixed-value of the lattice parameter at $a_{NIST}$ is conducted. The reliability factors are $R_{wp}^{f,(152)}$=8.355% and $R_{wp}^{f,(92)}$=8.623%, where the superscript 'f' refers to the "fixed". In both cases of $2\theta_{max}$=152° and 92°, $R_{wp}^f$ is larger than $R_{wp}^c$ even though the lattice parameter is the true value of $a_{NIST}$ for $R_{wp}^f$. It is clear that true lattice parameter cannot be obtained only by the conventional criterion on $R_{wp}$.

The peak-shift parameters in the above analyses of $2\theta_{max}$=152° and 92° are, respectively, $$Z^{f,(152)}=0.0754(38)°, D_s^{f,(152)}=-0.0417(34)°, T_s^{f,(152)}=0.00131(19)° \text{ and}$$

$$Z^{f,(92)}=0.0288(14)°, D_s^{f,(92)}=-0.0601(13)°, T_s^{f,(92)}=0.00663(44)°.$$

The peak-shift $\Delta 2\theta_R^f$ is computed by substituting the above parameters in Eq. (1).

Figure 9A:
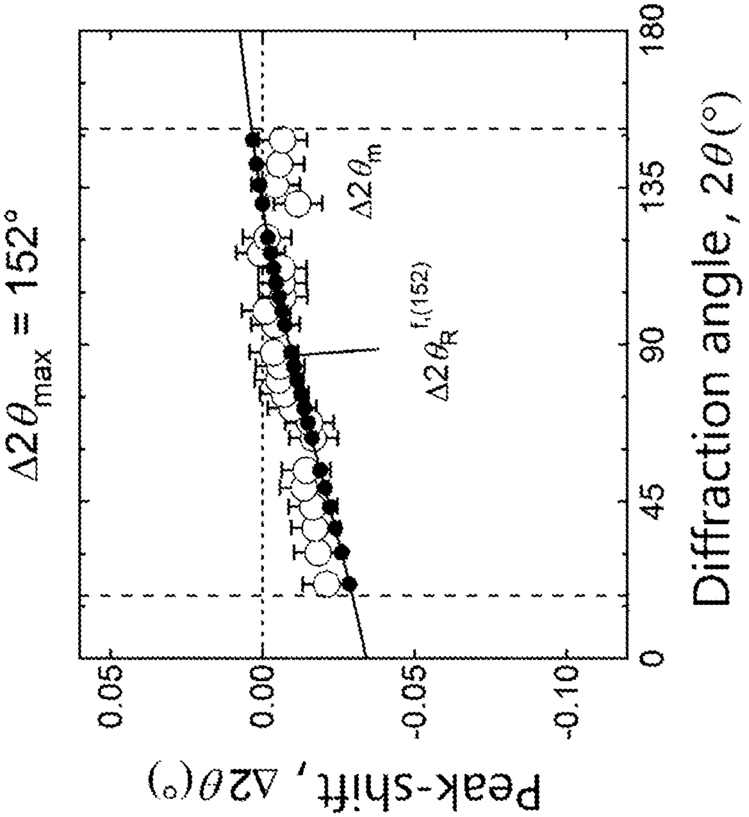
FIGS. 9(*a*)-9(*b*) are the example results of the peak-shift parameter with fixing the lattice parameter at the reference value obtained by the conventional criterion (black triangles) and a new criterion of the present invention (open circles).
Figure 9B:
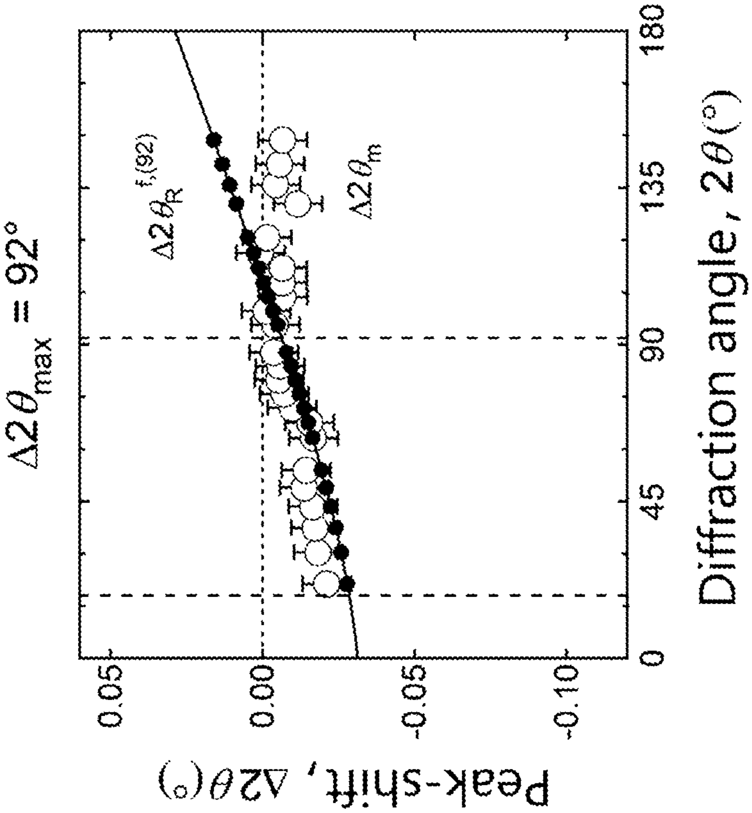

FIGS. 9(*a*) and 9(*b*) show the 2θ dependence of $\Delta 2\theta_R^f$ and $\Delta 2\theta_m$ for $2\theta_{max}$=152° and 92°, respectively. For $2\theta_{max}$=92°, $\Delta 2\theta_R^f$ slightly differs from $\Delta 2\theta_m$ in the high 2θ region; however, it would be so because the data above $2\theta \geq 2\theta_{max}$ is not used in the calculation. Therefore, $\Delta 2\theta_R^f$ agrees well with the true peak-shift $\Delta 2\theta_m$ in the analysis range of $18° \leq 2\theta \leq 2\theta_{max}$. Thus, it is confirmed that the peak-shift also corresponds to the true one in the analysis 2θ range when the lattice parameter is the true value. Note that the vertical dashed lines in FIGS. 9(*a*) and 9(*b*) represent the smallest and the highest values in the analysis, respectively.

Figure 10A:
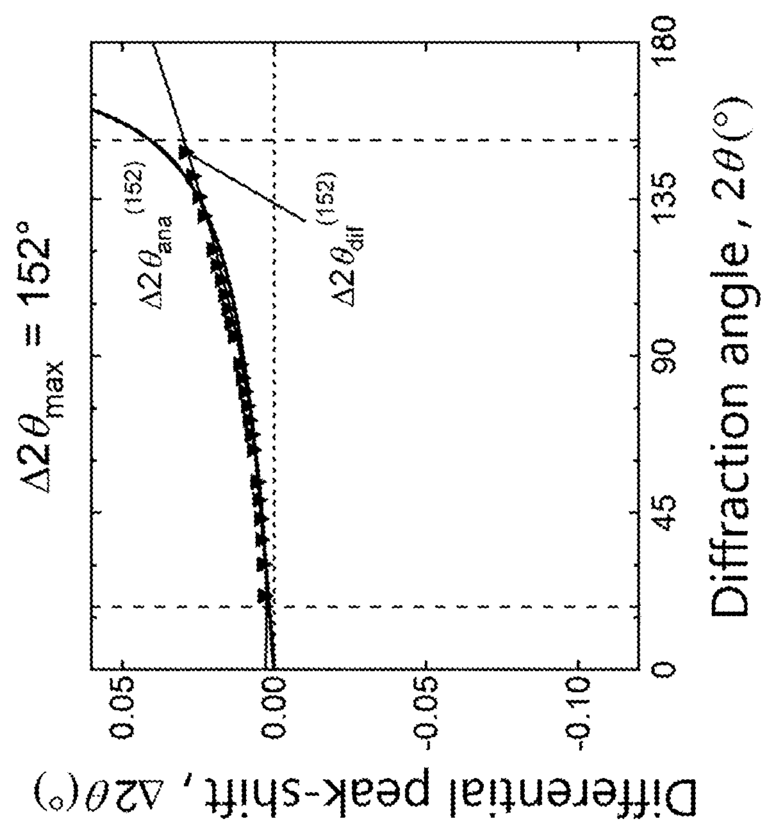
FIGS. 10(*a*)-10(*b*) are the example results of the differential peak-shift parameter and the analytical peak-shift parameter caused by the difference of the lattice parameters.
Figure 10B:
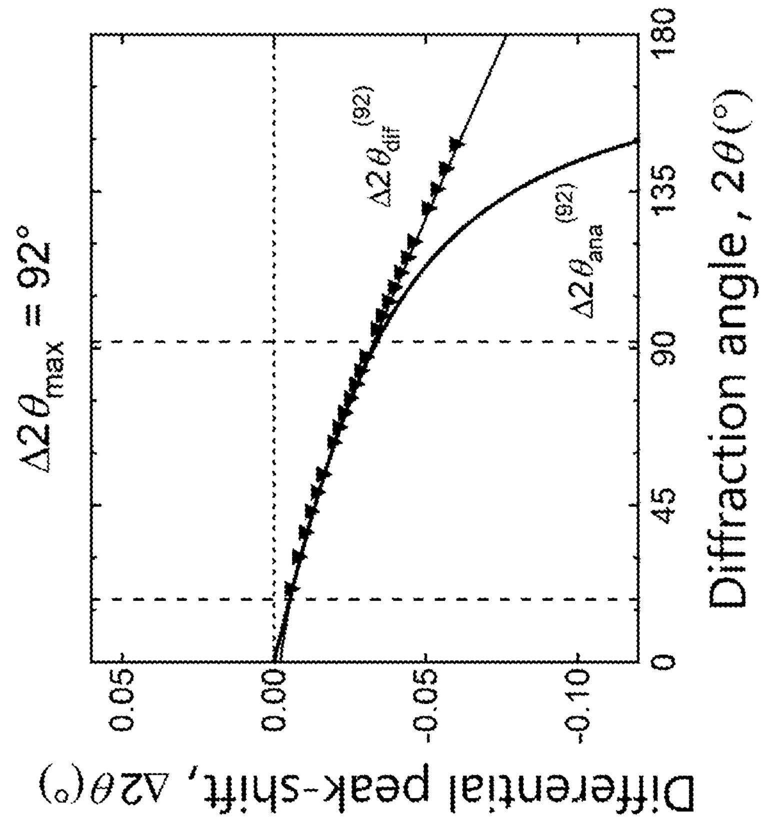

FIGS. 10(*a*) and 10(*b*) show the 2θ dependence of the difference $\Delta 2\theta_{dif} \equiv \Delta 2\theta_R^{\,c} - \Delta 2\theta_R^{\,f}$ and $\Delta 2\theta_{ana}$ (Eq. (2)), respectively. Both $\Delta 2\theta_{dif}^{(152)}$ and $\Delta 2\theta_{dif}^{(92)}$ are clearly non-zero and have non-negligible values compared with $\Delta 2\theta_m$ (FIGS. 8 and 9). Moreover, $\Delta 2\theta_{dif}$ agrees well with $\Delta 2\theta_{ana}$ in the analyzing 2θ region. Here, $\Delta 2\theta_{ana}$, expressed as Eq. (2), is the analytical peak-shift caused by a difference of the lattice parameter from the true value; and is derived as follows.

$$\Delta 2\theta_{ana} = 2\{\arcsin(\sin\theta/C) - \theta\} \quad \text{[Equation 2]}$$

For a crystal with lattice spacing d, the Bragg's equation is expressed by Eq. (3), where 2θ is the diffraction angle (e.g., Ref 6). A C times larger crystal, compared with the above, has lattice spacing C×d, where C is the coefficient. In this case, the Bragg's equation is expressed as Eq. (4). Rearranging Eqs. (3) and (4), we obtain Eq. (2). The coefficients are calculated to be $C^{(152)} = a^{c,(152)}/a_{NIST} = 0.999911$ and $C^{(92)}/a^{c,(92)}/a_{NIST} = 1.000286$, respectively, for $2\theta_{max} = 152°$ and 92°.

$$2d\sin(2\theta/2) = \lambda \quad \text{[Equation 3]}$$

$$2(C\times d)\sin\{(2\theta + \Delta 2\theta_{ana})/2\} = \lambda \quad \text{[Equation 4]}$$

From the above, it is found that the analytical peak-shift, which is cause by the mismatch of the lattice parameter from the true one and is expressed by Eq. (4), exists in the calculation. Namely, the peak-shift should be expressed by Eq. (5) not Eq. (1). The superscript 'G' refers to the "Geometry". C is the coefficient of the ratio on the true value of the lattice parameter (the unit cell).

$$\Delta 2\theta_R = Z^G + D_s^{\,G}\cos\theta + T_s^{\,G}\sin 2\theta + 2\{\arcsin(\sin\theta/C) - \theta\} \quad \text{[Equation 5]}$$

Here, another important fact is that Eq. (2) and Eq. (5) can be fitted by Eq. (1). In other words, $\Delta 2\theta_{ana}$ in Eqs. (2) and (5) are fitted by a formula of $\Delta 2\theta_{ana} = \zeta + \delta_s\cos\theta + \tau_s\sin 2\theta$. This is also understood from the fact that $\Delta 2\theta_{ana}$ corresponds to $\Delta 2\theta_{dif}$ in FIGS. 10(*a*) and 10(*b*). According to this, Eq. (5) can be expressed with Eq. (6). Here, comparing Eqs. (1) and (6), it is found that Z, $D_s$ and $T_s$ correspond to $(Z^G+\zeta)$, $(D_s^{\,G}+\delta_s)$ and $(T_s^{\,G}+\tau_s)$, respectively. It also indicates that the peak-shift parameters Z, $D_s$ and $T_s$ obtained by Eq. (1) in the conventional Rietveld analysis are different from the geometrical peak-shift parameters $Z^G$, $D_s^{\,G}$ and $T_s^{\,G}$, respectively. It is evident that the peak-shift which carries information along the x-axis, cannot be correctly fitted by using Eq. (1). Thus, the conventional criterion $R_{wp}$ uses information along the y-axis. Therefore, the true solution cannot be obtained. This is the reason for the fact (i).

$$\Delta 2\theta_R = Z^G + D_s^{\,G}\cos\theta + T_s^{\,G}\sin 2\theta + \zeta + \delta_s\cos\theta + \tau_s\sin 2\theta = (Z^G+\zeta) + (D_s^{\,G}+\delta_s)\cos\theta + (T_s^{\,G}+\tau_s)\sin 2\theta \quad \text{[Equation 6]}$$

Next, about the fact (ii), it is found that the peak-shift is expressed by the above Eq. (5) as shown in the fact (i). To obtain the correct lattice parameter accurately, C=1 in Eqs. (5) and (2) or $\Delta 2\theta_{ana} = 0$ should be imposed. In practice, preventing Eq. (2) from diverging is equivalent to the above conditions. However, as the peak-shift parameters obtained by the Rietveld analysis are the sum of Eqs. (1) and (2), it is impossible to evaluate the parameters coming from Eq. (2) itself. Therefore, Eq. (7), which is the sum of Eqs. (1) and (2), should be used instead. Equation (7) is qualitatively equivalent one to Eq. (5). The first term of the right-hand side in Eq. (7) is caused by the experiment and corresponds to Eq. (1). The second term of the right-hand side in Eq. (7) is caused by the analysis and corresponds to Eq. (2).

$$\Delta 2\theta_R = \Delta 2\theta_{exp} + \Delta 2\theta_{ana} \quad \text{[Equation 7]}$$

Here, the first term of Eq. (7) is ideally zero but is realistically finite depending on 2θ and should be determined at the time of measurement. On the contrary, the second term of Eq. (7) should be zero in the calculation when the lattice parameter is the true one, increases as a mismatch of the lattice parameter and diverges with 2θ. Considering the sum of the above peak-shift, it is possible to impose restriction preventing Eq. (7) to diverge.

Moreover, the conventional criterion $R_{wp}$ is an indicator along the y-axis of the data; therefore, is insufficient not to enhance the peak-shift which is information along the x-axis of the data. The reasons are: (a) the parameters other than the peak-shift parameters contribute to the intensity along the y-axis of the data, and (b) the peak-shift is affected by Eq. (2). An example showing the $R_{wp}$ to be insufficient as a criterion is already given above in FIG. 8, etc.

Incidentally, the Rietveld analysis being one of the methods for crystal structural refinement; the structural parameters are usually reported in articles but no information about the peak-shift parameters is shown in these publications. Hence, it is uncertain that the obtained peak-shift parameters are verified to be the true values or not.

Accordingly, the reason why the unique solution is not obtained even by the representative specialists as shown in the Hill's report may be related to the fitting accuracy of the peak-shift.

Furthermore, the Rietveld method has been first developed by using the angle-dispersive neutron diffraction patter in the late 1960s. Neutron has very high transparency against the materials. Therefore, the peak-shift for the neutron diffraction data can be well approximated by a constant value. Moreover, neutron is scattered by nuclei in a material and shows the diffraction phenomenon. The diffraction peak width is very wide in the high 2θ regions because the distribution of nuclei is in the order of femto-meter. Therefore, the effect of the peak-shift on 2θ in the high 2θ angles is very tiny. In fact, Rietveld applied a constant parameter as the peak-shift function which is independent of 2θ in Ref 1 serving as the first report on the Rietveld method. It can be said that in the early days of the development, the error in the peak-shift caused by the person who is analyzing did not come to the forefront.

On the other hand, the Rietveld method has been applied to the X-ray data in the late 1970s. X-ray is scatted by electrons in a material and shows the diffraction phenomenon. The diffraction peak width is rather narrow compared with that in the neutron diffraction data not only in the high 2θ region but over the whole 2θ region because the distribution of electrons is in the order of Ångstrom. Therefore, the effect of the peak-shift on 2θ in the high 2θ angles is very large. Moreover, the synchrotron X-ray facilities are constructed all over the world since the 1980s and they provide X-rays and the apparatus with highly improved resolution. As a result, the effect of the peak-shift, especially, in the high 2θ region may have come into the forefront. In fact, the data reported in Ref 7 are measured by using X-rays in the 1980s and their results differ among the researchers. However, the Rietveld method has been spread widely without verifying the facts (i) and (ii) shown in the present invention because the method was well established in neutron study. The present invention solves the issue.

AVAILABILITY FOR INDUSTRY

This invention is available for quality checking of the powder products. At present, X-ray fluorescence has been generally used for the chemical analysis. However, one cannot distinguish whether the objective material is produced from the several raw materials by analyzing by X-ray fluorescence, though a amount of the contamination can be detected accurately and precisely. It means that there is no difference between the objective material and the raw materials in terms of chemical composition. It is expected that one can make a quality control by the present invention instead of X-ray fluorescence or combining with X-ray fluorescence, because the present invention achieves the high accurate qualitative and quantitative analysis. Furthermore, the present invention can determine the lattice parameters even for the lattice parameters for alloys, which continuously change with the composition.

For the examples for carrying out the present invention, the most generally function of Eq. (1) was used for the peak-shift function. The other functions such as Eqs. (8)-(11) are also used for the peak-shift function (see Refs. 3 and 4). Here, Eq. (11) represents a Legendre polynomial. A shape of the functions shown in Eqs. (8)-(11) are equivalent to (Eq.1), which is easily confirmed, for example, by setting the third term, $t_3$, in (Eq.8) is set at zero. Hence, Eqs. (8)-(11) realize the present invention as well.

$$\Delta 2\theta_R = t_0 + t_1 \cos\theta + t_s \sin 2\theta + t_3 \tan\theta. \quad \text{[Equation 8]}$$

$$\Delta 2\theta_R = t_0 + t_1(2\theta) + t_2(2\theta)^2 + t_3(2\theta)^3. \quad \text{[Equation 9]}$$

$$\Delta 2\theta_R = t_0 + t_1 \tan\theta + t_2 \tan^2\theta + t_3 \tan^3\theta \quad \text{[Equation 10]}$$

$$\Delta 2\theta_R = t_0 F_0(\theta) + t_1 F_1(\theta) + t_2 F_2(\theta) + t_3 F_3(\theta) \quad \text{[Equation 11]}$$

Note that $\Sigma^{all}|\Delta 2\theta_R|$ is shown as a criterion in the examples for carrying out the present invention but is not the only function. The other functions such as $\int|\Delta 2\theta_R|d(2\theta)$ can be also available.

The present invention can be applied for both X-ray and neutron experiments and both the angular dispersive and energy dispersive apparatus. Moreover, an application of the present invention is not limited to the Rietveld analysis. The present invention can be applied to the similar analysis such as a indexing and a pattern decomposition with the diffraction data. Particularly, the criterion shown in the present invention can be used as it is for the pattern decomposition, because the principle of the pattern decomposition is the same as that of the Rietveld analysis. The difference of the pattern decomposition and the Rietveld analysis is a calculation method the integrated intensity.

EXPLANATION OF REFERENCE LETTERS

100 a first calculating step of the converged values
200 a first judging step of the best converged values
300 a second calculating step of the converged values
400 a second judging step of the best converged values
500 a first selecting step of a better solution
600 a third calculating step of the converged values
700 a third judging step of the best converged values
800 a first calculating step of the global solution

The invention claimed is:

1. A method for determining structural parameters of a crystal included in a powder by determining a best solution of refinement parameters for a powder diffraction pattern of the powder, the method comprising:
obtaining the powder diffraction pattern, wherein the powder diffraction pattern is collected using neutrons or X-rays;
calculating, using the powder diffraction pattern, converged values for the refinement parameters;
determining the best converged values to calculate a criterion from peak-shift parameters in the converged values and to determine whether the above converged values are the true values or not; and
when the above converged values are determined to be the true values, determining the structural parameters using the converged values.

2. A method for determining structural parameters of a crystal included in a powder by determining a better solution of refinement parameters for a powder diffraction pattern of the powder, the method comprising:
obtaining the powder diffraction pattern, wherein the powder diffraction pattern is collected using neutrons or X-rays;
calculating, using the powder diffraction pattern, converged values to calculate at least two sets of converged values of the refinement parameters for the powder diffraction pattern;
determining the best converged values to calculate at least two criteria from peak-shift parameters in the converged values and to determine whether the above sets of the converged values are the true values or not;
selecting a better solution to select the converged values which are closer to the true solution among several sets of the by using at least two criteria; and
determining the structural parameters using the selected converged values.

3. A method for determining structural parameters of a crystal included in a powder by determining a best solution of refinement parameters for a powder diffraction pattern of the powder, the method comprising:
obtaining the powder diffraction pattern, wherein the powder diffraction pattern is collected using neutrons or X-rays;
calculating, using the powder diffraction pattern, converged values to calculate at least three sets of converged values of the refinement parameters for the powder diffraction pattern;
determining the best converged values to calculate at least three criteria from peak-shift parameters in the converged values and to determine whether the above sets of the converged values are the true values or not;
calculating the global solution to determine which converged values is the true global solution among several sets of the converged values by using at least three criteria; and
determining the structural parameters using the converged values that are determined to be the true global solution.

4. A non-transitory computer-readable medium including a calculation program which, when executed by a processor, determines structural parameters of a crystal included in a powder by determining a best solution of refinement parameters for a powder diffraction pattern by performing steps comprising:
obtaining the powder diffraction pattern, wherein the powder diffraction pattern is collected using neutrons or X-rays;
calculating, using the powder diffraction pattern, converged values for the refinement parameters;
determining of the best converged values to calculate a criterion from peak-shift parameters in the converged values and to determine whether the above converged values are the true values or not; and
when the above converged values are determined to be the true values, determining the structural parameters using the converged values.

5. A non-transitory computer-readable medium including a calculation program which, when executed by a processor, determines structural parameters of a crystal included in a powder by determining a better solution of refinement parameters for a powder diffraction pattern by performing steps comprising:

obtaining the powder diffraction pattern, wherein the powder diffraction pattern is collected using neutrons or X-rays;

calculating, using the powder diffraction pattern, converged values to calculate at least two sets of converged values of the refinement parameters for the powder diffraction pattern;

determining the best converged values to calculate at least two criteria from peak-shift parameters in the converged values and to determine whether the above sets of the converged values are the true values or not;

selecting a better solution to select the converged values which are closer to the true solution among several sets of the by using at least two criteria; and determining the structural parameters using the selected converged values.

6. A non-transitory computer-readable medium including a calculation program which, when executed by a processor, determines structural parameters of a crystal included in a powder by determining a best solution of refinement parameters for a powder diffraction pattern by performing steps comprising:

obtaining the powder diffraction pattern, wherein the powder diffraction pattern is collected using neutrons or X-rays;

calculating converged values to calculate at least three sets of converged values of the refinement parameters for the powder diffraction pattern;

determining the best converged values to calculate at least three criteria from peak-shift parameters in the converged values and to determine whether the above sets of the converged values are the true values or not;

calculating a global solution to determine which converged values is the true global solution among several sets of the converged values by using at least three criteria; and determining the structural parameters using the converged values that are determined to be the true global solution.

7. A method for determining structural parameters of a crystal included in a powder by determining the best solution of refinement parameters for a powder diffraction pattern of the powder, the method comprising:

obtaining data corresponding to the powder diffraction pattern, the powder diffraction pattern having been collected using neutrons or X-rays;

calculating a criterion relating to information along the x-axis of the data, directly from the peak-shift parameters and the lattice parameters, wherein "the x-axis of the data" indicates a physical quantity which corresponds to the space lattice of the unit cell such as a diffraction angle or time-of-flight; and determining the structural parameters of a crystal using the criterion.

8. A non-transitory computer-readable medium including a calculation program which, when executed by a processor, determines structural parameters of a crystal included in a powder by determining the best solution of refinement parameters for a powder diffraction pattern by performing steps comprising:

obtaining data corresponding to the powder diffraction pattern, the powder diffraction pattern having been collected using neutrons or X-rays;

calculating a criterion relating to information along the x-axis of the data, directly from the peak-shift parameters and the lattice parameters; and determining the structural parameters of a crystal using the criterion.

* * * * *